W. L. ROOT.
STALL.
APPLICATION FILED MAR. 7, 1911.
1,004,202.
Patented Sept. 26, 1911.
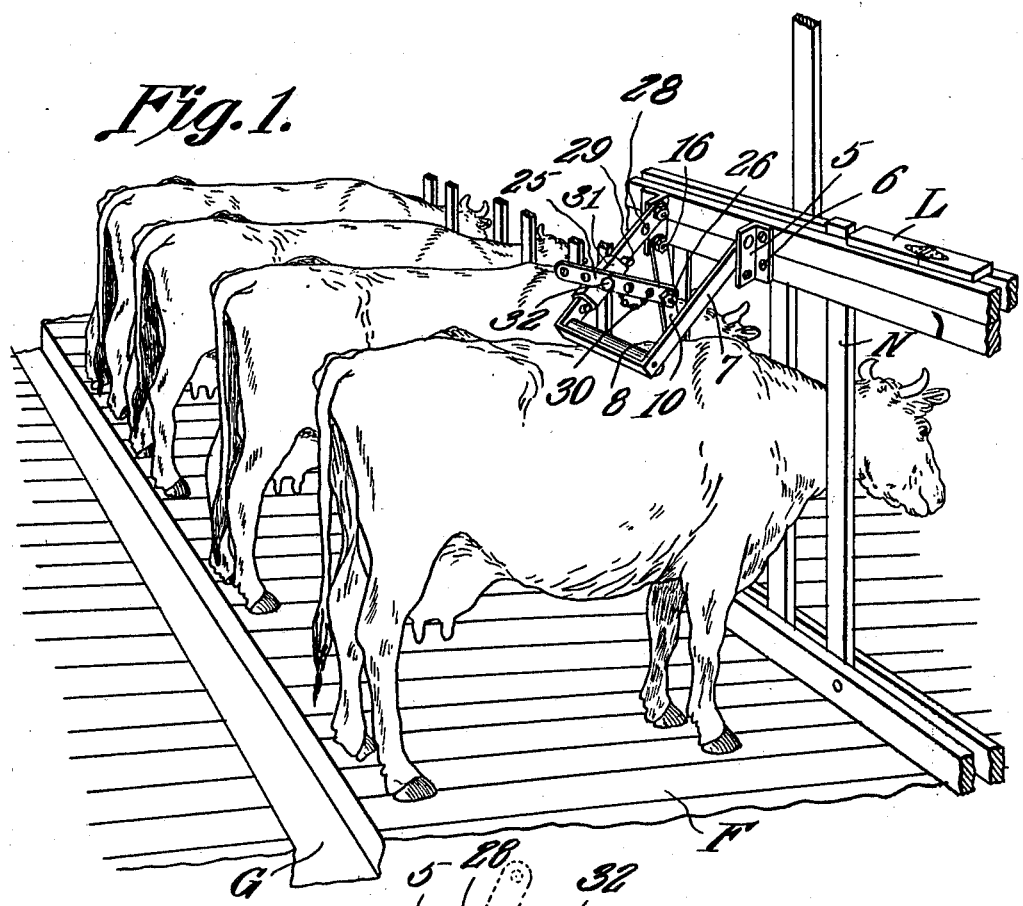
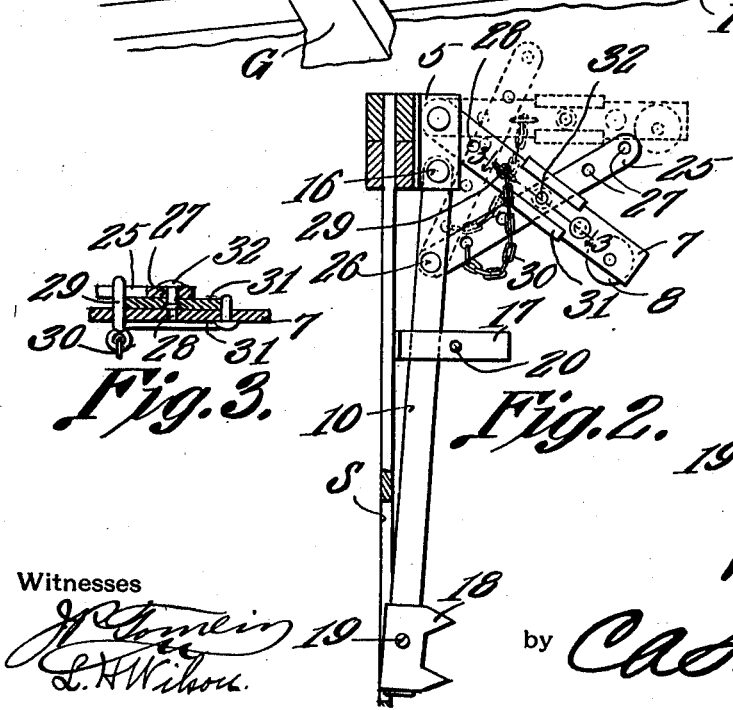
Witnesses
W. L. Root,
Inventor
by C. A. Snow & Co.
Attorneys

UNITED STATES PATENT OFFICE.

WAYLAND L. ROOT, OF SPOKANE, WASHINGTON.

STALL.

1,004,202.  Specification of Letters Patent.  Patented Sept. 26, 1911.

Application filed March 7, 1911. Serial No. 612,760.

*To all whom it may concern:*

Be it known that I, WAYLAND L. ROOT, a citizen of the United States, residing at Spokane, in the county of Spokane and State of Washington, have invented a new and useful Stall, of which the following is a specification.

This invention relates to animal husbandry, and more especially to stalls such as are used in stables particularly employed for dairy cattle; and the objects of the same are to prevent the cow from humping her back without causing her shoulder to be pricked, and hence to cause her to step backward in the stall as a result of such pricking of her shoulder—all this being brought about for a purpose to appear hereinafter. These objects are accomplished by the construction I will now describe and claim, and as shown in the drawings wherein—

Figure 1 is a perspective view of a cow shed or stable showing one form of my invention disposed above the cow in the foreground. Fig. 2 is an enlarged side elevation of the mechanism itself. Fig. 3 is a sectional detail on the line 3—3 of Fig. 2. Fig. 4 is a perspective detail of the pricker.

It is well known to dairymen and others who have charge of cows that at night they recline on the floor of their stalls, and at such time the udder comes in contact with the floor. Hence there is a sanitary reason, beyond that of mere cleanliness, why the floor of the stall should be kept free from excrement if possible, and this is usually attempted by running a gutter across the rear end of the stall. However, the droppings do not always fall into this gutter unless the stall is made extremely short and in that case the animal often steps back into it when she will of course foul her rear hoofs and the object aimed at is therefore defeated. I have discovered that the cow will hump her back just prior to the act of evacuating or kicking, and I have devised the following mechanism by which the natural function of humping her back is converted into an impulse on her part to step backward, with the obvious result that her hind quarters come directly above a gutter which may be extended across the rear end of the stall floor.

In the drawings the letter F designates the stall floor, G the gutter hereinbefore referred to, and N is the neck piece of the stanchion which is held removably in upright position by a latch L, whereby the neck of the cow is locked in the stanchion although somewhat loosely in order to permit her to recline, yet by lifting the latch the dairyman can open the stanchion and release the animal when desired.

Coming now more particularly to the present invention, the numeral 5 designates a bracket which is by preference an L-shaped plate having one leaf attached to the stanchion and the other leaf provided with a series of eyes 6, and the numeral 7 designates a U-shaped member or yoke whose open end is pivotally supported in a pair of eyes 6 and whose closed end may carry a roller 8, it being the intention that this roller at the closed end of the yoke shall stand across the back of the cow about midway between her forequarters and her hindquarters as shown in Fig. 1.

The numeral 10 designates a pendant arm or rod pivotally supported at its upper end in a suitable way, as at 16, passing through a guide 17 in which it is adapted to swing, and its lower end carrying a pricker 18 which is preferably a separate piece of metal held thereon by a screw 19 or other suitable fastening device; and this lower end and pricker are usually housed within a slot S within the stanchion as best seen in Fig. 2, and can be retained therein by inserting a pin or bolt through the guide 17 at the point 20.

As thus far described, the outer end of the yoke will rise and fall with the movements of the cow's back, and the lower end of the arm is capable of moving horizontally if the stop pin 20 be removed. If now some connection is made between these two elements, it is obvious that when the cow humps her back she will cause the pricker 18 to touch her front shoulders, and that in turn will cause her to take a step backward within the stall so that the end desired is accomplished. The means which I employ for connecting these elements will now be described.

The numeral 25 designates a link pivoted at 26 to the arm 10 and having a series of holes 27 through its body, and similar holes 28 are formed through one arm of the yoke 7.

The numeral 29 designates a pin, preferably supported by a chain 30, and it is obvious that if a pair of said holes is caused to register and the pin be inserted therein, an upward movement of the outer end of the yoke will cause a rearward movement of the lower end of the arm because of the links connecting these elements. In view of the fact that different cows have backs of different heights, I prefer to provide means for adjustably pivoting one of said members to the link, and this I accomplish by providing a slide or runner 31 on one member (such as the arm of the yoke) and pivoting the other member positively thereto, as by the rivet 32; after which the pin 29 will be inserted through the proper hole to cause the slide to strike against it as the cow raises her back, by withdrawing the pin and moving the slide upward along the arm of the yoke and insert the pin in a hole beneath the slide, thus holding the yoke in an elevated position so it will be out of the way of the stock while going in or coming out of the stall. Then by removing the pin and lowering the yoke into position, and placing the pin just above the slide it is then adjusted for use.

Thus it will be seen that I have produced an attachment for stanchions in cow stables by means of which when the animal humps her back just prior to the performance of any natural function she causes the arm to swing backward and the pricker 18 to strike and perhaps to slightly prick her shoulder, with the result that she naturally steps back in her stall. It will be but a short time before the animal can be taught this trick, and then the pricker 18 can be removed from arm 10, or arm 10 can be held fast in its place by a bolt through guide 17 at point 20 and the cow will then back up and get away from the yoke and get into her natural position and the same result is accomplished. The precise construction as well as the proportion and material of parts are not essential to the successful operation of this invention.

What is claimed is:

1. The herein described attachment for stalls comprising a member pivoted at one end to a support and lying across the animal's back between her forequarters and hindquarters, the said member having a series of holes therein, an arm pivoted to said support and having a pricker at its lower end disposed toward the animal's shoulder, a link pivoted to said arm and having in its body a series of holes, and a pin removably engaging one hole of each member.

2. The herein described attachment for stalls comprising a member pivoted at one end to a support and lying across the animal's back between her forequarters and hindquarters, the said member having a series of holes therein, an arm pivoted to said support and having a pricker at its lower end disposed toward the animal's shoulder, a link pivoted to said arm and having in its body a series of holes, and a pin removably engaging one hole of each member, a guide in which said arm swings, and a pin removably inserted in said guide.

3. The herein described attachment for stalls, the same comprising a yoke pivoted at its open end to the stanchion and with its closed end extending across the animal's back between her forequarters and hindquarters, a roller mounted in said yoke near its closed end, one of its arms having a series of holes, an arm pivoted to said stanchion and having a pricker at its lower end disposed toward the animal's shoulder, a link pivoted to said arm and having in its body a series of holes, a pin removably engaging one hole in each series, a guide in which said arm swings, and a pin removably inserted across said guide.

4. The herein described attachment for stalls, the same comprising a yoke pivoted at its open end to the stanchion and with its closed end extending across the animal's back between her forequarters and hindquarters, a roller mounted in said yoke near its closed end, one of its arms having a series of holes, an arm pivoted to said stanchion and having a pricker at its lower end disposed toward the animal's shoulder, a link pivoted to said arm and having in its body a series of holes, a slide movable upon the perforated arm of the yoke, connections between said slide and one of the holes in said link, and a pin through one of the holes in said arm against the upper end of said slide.

In testimony that I claim the foregoing as my own, I have hereto affixed my signature in the presence of two witnesses.

WAYLAND L. ROOT.

Witnesses:
R. A. LEE,
G. P. DANIEL.

---

Copies of this patent may be obtained for five cents each, by addressing the "Commissioner of Patents, Washington, D. C."